US007433457B2

(12) United States Patent
Marwell et al.

(10) Patent No.: US 7,433,457 B2
(45) Date of Patent: *Oct. 7, 2008

(54) PERSONALIZED ASSISTANCE SYSTEM AND METHOD

(75) Inventors: Evan Marwell, New York, NY (US); Robert Pines, New York, NY (US)

(73) Assignee: Grape Technology Group, Inc., Bethlehem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/393,593

(22) Filed: Mar. 30, 2006

(65) Prior Publication Data

US 2007/0041555 A1 Feb. 22, 2007

Related U.S. Application Data

(63) Continuation of application No. 11/111,119, filed on Apr. 21, 2005, now abandoned, which is a continuation of application No. 10/719,987, filed on Nov. 21, 2003, now abandoned, which is a continuation of application No. 10/158,571, filed on May 29, 2002, now Pat. No. 6,668,055, which is a continuation of application No. 09/449,126, filed on Nov. 24, 1999, now Pat. No. 6,404,884.

(51) Int. Cl.
*H04M 3/493* (2006.01)
*H04M 3/523* (2006.01)
*G06F 12/00* (2006.01)
*G06F 17/30* (2006.01)

(52) U.S. Cl. ............. 379/218.01; 379/223; 379/265.09; 379/265.13; 379/266.02; 379/900; 455/414.3; 707/1; 707/10; 707/200

(58) Field of Classification Search ............ 379/201.01, 379/201.02, 214.01, 218.01, 223, 265.01, 379/265.02, 265.09, 265.13, 266.01, 266.02, 379/900; 455/414.1, 414.3; 707/1, 3, 10, 707/200
See application file for complete search history.

(56) References Cited

U.S. PATENT DOCUMENTS

| 5,204,894 | A | 4/1993 | Darden | 379/88 |
|---|---|---|---|---|
| 5,652,789 | A | 7/1997 | Miner et al. | 379/201 |
| 5,943,417 | A | 8/1999 | Cox et al. | 379/266 |
| 5,943,611 | A | 8/1999 | Molne | 455/89 |
| 6,000,031 | A | 12/1999 | Bingaman et al. | 713/200 |
| 6,404,884 | B1 | 6/2002 | Marwell et al. | 379/265.13 |

(Continued)

FOREIGN PATENT DOCUMENTS

EP 0823809 2/1998 .................. 3/50

*Primary Examiner*—Harry S Hong
(74) *Attorney, Agent, or Firm*—Sofer & Haroun, LLP

(57) ABSTRACT

The present invention is a personalized assistance system for a user of a telephone, comprised of a first database, the first database having a contact list for the user. The contact list includes at least one contact name and a corresponding contact number and including the user's electronic commerce information. A telephone identification code is uniquely associated with the telephone and electronically transmitted to the personalized assistance system, when the user calls the system.

A customer service representative terminal, coupled to the database and the telephone hardware are provided where the telephone identification code prompts automatic retrieval of the contact list to the customer service representative terminal in response to processing the telephone identification code. The customer service representative terminal obtains the electronic commerce information in response to a user request to perform an electronic commerce transaction.

15 Claims, 13 Drawing Sheets

U.S. PATENT DOCUMENTS

| | | | |
|---|---|---|---|
| 6,456,709 B1 | 9/2002 | Cox et al. | 379/218.01 |
| 6,668,055 B2 | 12/2003 | Marwell et al. | 379/265.13 |
| 2004/0151300 A1* | 8/2004 | Marwell et al. | 379/265.13 |
| 2005/0185786 A1* | 8/2005 | Marwell et al. | 379/218.01 |

* cited by examiner

| DID NO. | SEQ | UDP ADDRESS | UDP PORT | UDP TIMEOUT |
|---|---|---|---|---|
| 6300 | 1 | 123456789 | 4001 | 1000 |
| 6400 | 1 | 123456780 | 4001 | 1000 |
| ... | ... | ... | ... | ... |
| 9000 | 1 | 123456799 | 4001 | 1000 |

FIG. 4

PERSONALIZED ASSISTANCE SYSTEM AND METHOD

This application is continuation of abandoned U.S. application No. 11/111,119 filed Apr. 21, 2005, which is a continuation of abandoned U.S. Ser. No. 10/719,987 filed Nov. 21, 2003, which is a continuation of U.S. application Ser. No. 10/158,571 filed May 29, 2002, now U.S. Pat. No. 6,668,055 which is a continuation of U.S. application No. 09/449,126 filed Nov. 24, 1999, now U.S. Pat. No. 6,404,884 all of which are incorporated herein by reference.

BACKGROUND OF THE INVENTION

The present invention relates to communications, and more particularly, to a system and method which provides personalized assistance by allowing a user to preprogram a contact database such that the user can quickly reach a live customer service representative who can search the personalized database and connect the user to his or her desired destination or arrange to perform a service or purchase an item.

Society's demand for virtually instantaneous access to information, and the need to quickly contact others is constantly increasing. To meet this demand, personal information manager (PIM) software for various types of computers, personal digital assistants (PDA) and global communication networks, such as the Internet, have been developed which facilitate access to data. For example, a person may have contact and telephone numbers stored in their PDA or electronic organizer, such that they can quickly determine the phone number of the person they wish to reach. Similarly, they may have a PIM database on their laptop which contains the same information, such that the PIM and PDA databases are harmonized, i.e., synchronized. Recently developed Internet software allows a user to harmonize a PIM contact information database with an Internet web site.

While the contact data may be available to the user, the data may not be readily accessible, or may be voluminous, thereby requiring the user to search through the contact data in order to determine the telephone number of the person they wish to reach. For example, a user driving in their car who wishes to determine the telephone number of another person must pull to the side of the road, or risk getting into an accident, in order to boot up their PC or interact with their PDA. This arrangement is dangerous and inefficient.

The proliferation of telephone communication technologies, including cellular (mobile) telephone technology, extends the ability of an individual to contact another to virtually any location in any situation. For example, a cellular telephone user delayed by traffic, or in an emergency, can contact others without the need to seek out a pay telephone or other means of communications, provided they know the telephone number of the party whom they wish to contact. The environmental conditions surrounding the individual's use of the telephone, whether cellular or wire-based, does not always lend itself to easy retrieval of telephone numbers and contact information.

For example, an individual may program the contact data and telephone numbers into their cellular telephone and use the keypad of the cellular telephone to search through the stored database to locate and dial the desired number. This is often difficult when the user is driving an automobile, or is in another situation which demands their entire undivided attention. Even where the individual is not in a situation where their undivided attention is required, the individual may not want to fumble with their PDA or telephone, or boot up their personal computer (PC), to search for and access contact data.

Technologies have also been developed, such as voice activated dialing, which allows a user to initiate a dialing sequence by speaking the name of the individual whom they wish to contact into the telephone dialing unit. Voice activated dialing systems use speech recognition patterning to search through a stored contact database to initiate dialing. These technologies, however, typically require that the individual use a specific telephone, for example, a cellular telephone, which they have programmed to recognize their voice and have created a database of associated contact names and numbers. In other words, an individual typically cannot employ the use of voice activated dialing if they use a telephone or device which is not equipped to recognize their speech pattern. Network-based voice recognition systems are also cumbersome to use. Their operability is unreliable, and these systems are difficult and cumbersome to configure. In addition, these systems offer limited functionality, typically serving as mere dialing units. Voice activated dialing technology, therefore, limits the flexibility of a user to contact another person or arrange for the performance of personal services.

In sum, existing technologies allow individuals the ability to carry large volumes of information on their person, or access large volumes of information, and to communicate with others from virtually any location. However, these technologies do not allow the individual a quick, safe and efficient way to initiate contact with another from any location which supports cellular or wire-based telephony.

SUMMARY OF THE INVENTION

The present invention provides a system which allows the user of a telephone, in particular, a mobile telephone, to easily complete a call to a destination, even when they do not know the number, and without the need to recall the contact's telephone number using the keypad of their telephone, and without the need to boot up a personal computer or hand-held computer such as a PDA.

The present invention further provides a plurality of techniques for users to create and update their personal contact list, and provides for the harmonization, i.e., synchronization, of users' databases with a master database. The ability to harmonize databases further simplifies the process of maintaining multiple contact lists, while still allowing the storage of contact data in forms needed by different technologies.

As one aspect of the invention, a personalized assistance system for a user of a telephone is provided in which the personalized assistance system has a database including a contact list for the user such that the contact list includes at least one contact name and a corresponding contact number. Telephony hardware couples the telephone to the database. A customer service representative terminal is coupled to the database and the telephone hardware in which the customer service representative terminal searches the database in response to a user query to locate a designated contact from the user's contact list and causes the telephony hardware to connect the telephone with the contact number corresponding to the designated contact.

As another aspect of the invention, a system for populating and maintaining a list of personal contact data for a user of the system is provided, in which the system has at least one user terminal. A web server is coupled to the user terminal through a communication network such that the web server receives personal contact update data from the user terminal. A first database is coupled to the web server such that the first database stores the list of personal contact data. The list of personal contact data stored in the first database is updated with the personal contact update data received by the web server.

As still another aspect of the present invention, a signaling method for a personal assistance system is provided in which a first dial string sent from a telephone is translated to a second dial string. The second dial string identifies an originating switch at least one of the originating service and originating service provider for the telephone. The second dial string is transmitted to a computer terminal, and a database is searched to identify a destination contact number. The database is searched to identify a network address of the originating switch in which the network address is identified in accordance with the second dial string. The destination number is sent to the network address of the originating switch using an out-of-band network.

As still yet another aspect, a method for using a telephone to contact a service for searching a database of contact numbers for a desired contact number and connecting a calling telephone to the desired contact number is provided in which a telephone number associated with the service is called. Data corresponding to the call is routed to a computer terminal, and the database is searched for a contact list corresponding to an identification number of the calling telephone. The contact list is retrieved and searched for the desired contact number. Call completion data is sent to a switch in which the call completion data corresponds to the desired contact number. The call is connected to the desired contact number.

Another aspect of the invention provides a method for populating and maintaining a list of personal contact data for a user of a personalized assistance system in which personal contact update data is received from a user terminal. A list of personal contact data is stored in a first database. The list of personal contact data stored in the first database is periodically synchronized with the received personal contact update data.

According to another aspect of the present invention, a method for using a telephone to contact a service for searching a database for desired information and performing an operation requested by a user is provided in which, a telephone number associated with the service is called. Data corresponding to the call is routed to a computer terminal. The database is searched for a contact list corresponding to an identification number of the calling telephone. The contact list is retrieved from the database. A requested operation is received from the user, and the requested operation is performed.

Other features and advantages of the present invention will become apparent from the following description of the invention which refers to the accompanying drawings.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIG. 4 is an example of an out-of-band address table;

DETAILED DESCRIPTION OF EMBODIMENTS OF THE INVENTION

Figure 1:
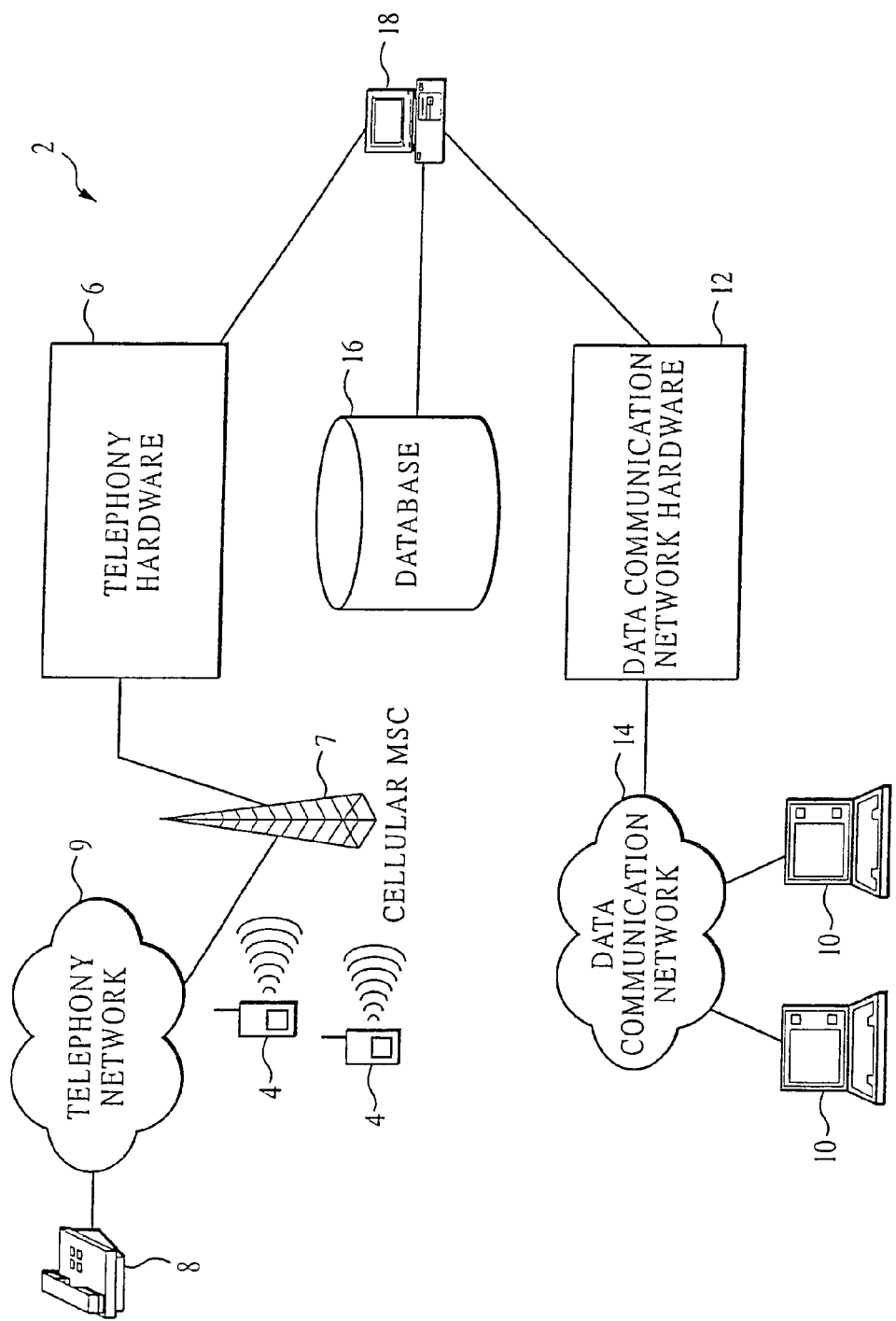
FIG. 1 is a diagram of a personalized directory assistance system of the present invention.

Referring now to the drawings wherein like reference numerals refer to like elements, there is shown in FIG. 1 a personalized directory assistance system of the present invention designated generally as "2". System 2 allows a user to populate a personalized contact directory (also referred to herein as a personal contact list) in a plurality of methods, such that the contact data can be automatically retrieved and searched by a customer service representative and the user connected to the designated contact. The user preferably dials an easy to remember telephone number, such as *4, and is quickly connected to the customer service representative who can help the user complete his or her call. Of course, a ten digit North American Dialing Plan number can also be used.

System 2 is preferably comprised of one or more telephones 4 coupled to telephony hardware 6 via cellular mobile switching center (MSC) 7, one or more destination telephones 8 coupled to cellular MSC 7 via telephony network 9, one or more user terminals 10 coupled to data communication hardware 12 via data communication network 14. Telephony hardware 6 and data communication network hardware 12 are further coupled to database 16 and customer service representative (CSR) terminal 18. In addition, customer service terminal 18 is further coupled to database 16.

Telephone 4 is preferably a cellular, or other wireless telephone, but can also be a wire-based telephone or any other device which facilitates voice communication. Telephony network 9 is preferably a typical public switched telephone network (PSTN) capable of transmitting and receiving voice communications. Telephony hardware 6, explained in detail below, is comprised of telephone and data networking components which facilitate identification of a caller and can cause cellular MSC 7 and telephony network 9 to properly switch the call to the desired destination.

When a call is received from telephone 4, telephony hardware 6 provides identification data to database 16 and alerts CSR terminal 18 of the incoming call such that a customer service representative using CSR terminal 18 is presented with the telephone user's contact directory and other personal information such as their name.

User terminals 10 are used to populate and update a user's personal contact list stored on database 16. User terminals 10 can be any computing device capable of accessing a server. Preferably, user terminals 10 are desktop or laptop personal computers running web browser software, such as MICROSOFT INTERNET EXPLORER or NETSCAPE COMMUNICATOR, or running PIM software, such as MICROSOFT OUTLOOK, or a hand-held computing device such as a PDA, for example, a 3COM PALM PILOT (or any other device running WINDOWS CE and the like).

In the case where user terminal 10 is a desktop or laptop personal computer, no specialized software or hardware configuration is required, other than that necessary to allow user terminal 10 to communication across a database communication network. For example, as is known in the art, user terminal 10 must have a network interface and data communication networking protocol software, such as Transmission Control Protocol/Internet Protocol (TCP/IP) drivers.

Data communication network 14 is preferably the Internet, but can be any network capable of communicating contact list data between user terminal 10 and data communication network hardware 12. As such, data communication network 14 allows any user with an appropriate user terminal 10 to create, revise and synchronize their personal contact list.

Data communication network hardware 12, described in detail below, is comprised of those elements necessary to facilitate communications between the various types of user terminals 10 and database 16 and CSR terminal 18. For example, data communication network hardware 12 is preferably comprised of a number of processors, each designed to accept data in various formats such that a user's personal contact list, as stored in database 16, can be easily created and/or revised. In other words, data communication network hardware 12 serves in part as a data filtration, conversion and storage subsystem for system 2.

Database 16 is preferably any known database system which can be programmed to support those data required to maintain a personal contact list, and also identify the user and originating telephone system (company) of telephone 4. Database 16 preferably supports multiple database tables for a voluminous quantity of users, each with potentially hundreds or thousands of records in, their personal contact list. Database 16 also stores multimedia data associated with each user or an organization who is sponsoring a group of users.

For example, database 16 can store a branded audio message associated with a sponsor such as the originating telephone company such that when the user accesses system 2 via telephone 4, the audio welcome message is retrieved by CSR terminal 18 and played to the user before the customer service representative picks up the user's telephone call. The welcome audio message is discussed in detail below.

Database 16 can be based on any known database software and any known database format, but is preferably a Microsoft SQL relational database engine. The hardware configuration of database 16 can be any hardware platform capable of supporting the quantity of users and entries in their respective contact lists. As such, database 16 can be as small as an Intel-based personal computer or as large as a mainframe computer.

Those of ordinary skill in the art can appreciate that although database 16 is shown as a single unit, it is not limited to this configuration. Database 16 can be comprised of multiple hardware units, i.e., central processing units and/or storage devices such as CD-ROMs, hard disk drives, tape disk drives, etc. which can communicate with each other across a transmission link. As such, it is contemplated that database 16 can take the form of a distributed database. For example, users who are primarily based on the west coast can be supported from a portion of database 16 located in California, while users primarily located on the east coast can access a portion of database 16 which is located in New York.

Database 16 is preferably a structured query language (SQL) database comprised of five different relational database tables. These include a user database table, personal contact list table for each user, updated contact list tables, rejected updated contact list tables and a listing arbitration table.

The user table stores information about each user, such as their name, address, company, telephone carrier, billing information, and the like.

The personal contact list tables preferably store contact names and numbers for each corresponding user. The personal contact list can also be arranged to include more detailed information about each contact, such as electronic and surface mail addresses, job title, company name, company address, facsimile telephone number, home web page address, birthday, and the like. Each entry in a contact list is assigned a unique identification number.

The updated listings tables store updated listings contact information which is to be added, deleted or revised for a user's contact list in system databases other than the directly updated database. In other words, a user seeking to revise their personal contact list operates on one list directly. These changes are then incorporated into personal contact list database copies in other system components, for example, a database in data communication network hardware 12, via a database synchronization process.

Changes are preferably verified prior to incorporation into the user's personal contact list. For example, a user attempting to harmonize their hand-held computer database with their personal contact list database initiates a harmonization process, as discussed in detail below. These changes are not incorporated into the user's personal contact list until the user's authenticity has been verified, for example, by ensuring that the user is authorized to perform harmonization operations, and once the requested change has been verified for accuracy, for example, that the requested change is not a duplicate of a previous request and such that the change request will not corrupt the user's personal contact list.

Those requested changes which cannot be implemented are stored in rejected updated listings tables along with a reason for the error, for example, that the user is an invalid user, that the requested change is a duplicate, and the like.

The listing arbitration table tracks the listing identification numbers assigned to each entry in a user's personal contact list. The listing arbitration table is used to track the listing identification numbers to ensure that a unique identification number is assigned. This facilitates future updates, deletions, etc., and also ensures that entries can be made from multiple sources, i.e., a web browser, CSR terminal, PDA, etc., without creating duplicate listing identification numbers.

CSR terminal 18 can be any device capable of accessing database 16 and communicating with telephony hardware 6 and data communication network hardware 12, but is preferably a personal computer running Microsoft Windows, or a UNIX workstation. Other than the ability to communication across a local and/or wide area network, there are no specific hardware requirements for CSR terminal 18.

Although it is preferred that a separate CSR telephone can be implemented as part of system 2 and coupled to telephony hardware 6 for communicating with user telephone 4, CSR terminal 18 is not limited to this arrangement. For example, CSR terminal 18 can be arranged to contain an integrated telephone (not shown). In other words, any arrangement which allows a customer service representative to engage in oral communications with the user of telephone 4 is sufficient. In addition, although only a single CSR terminal 18 is shown, system 2 is not limited to this arrangement. It is contemplated that system 2 is comprised of multiple CSR terminals 18 such that more than one customer service representative is available to accommodate the users of system 2. CSR terminals can also be geographically separated into multiple call centers and coupled by appropriate data networking components.

Figure 2:
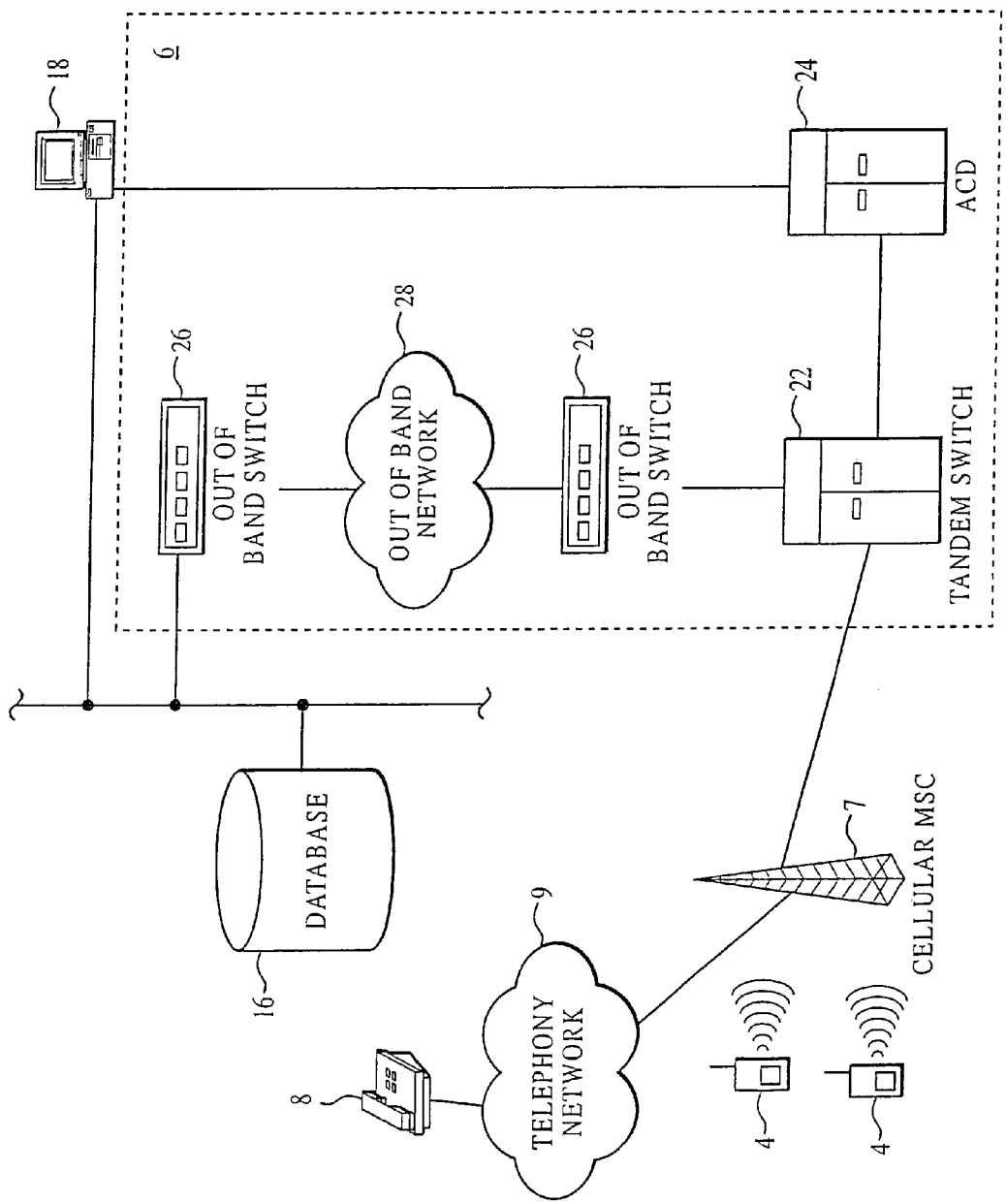
FIG. 2 is a diagram of the telephony elements of the present invention.

The telephony aspect of the present invention, including a detailed description of telephony hardware 6, is described with reference to FIG. 2. FIG. 2 is a detailed diagram expanding telephony hardware 6 shown in FIG. 1. As shown in FIG. 2, telephony hardware 6 is comprised of tandem switch 22, automatic call distributor (ACD) 24 and out-of-band switches 26 communicating across out-of-band network 28.

Although only one cellular MSC 7, tandem switch 22 and ACD 24 are shown, it should be understood that telephony hardware 6 can be configured to include more than one of each of these devices. For example, a plurality of cellular MSCs 7 can be coupled to one telephony network 9 or telephony networks provided by different carriers and further coupled to one or more tandem switches 22. Similarly, more than one ACD 24 can be implemented to distribute calls to a plurality of CSR terminals 18.

Cellular MSC 7 preferably comprises a mobile telephone switch used to receive cellular telephone calls from telephones 4. Cellular MSC 7 is preferably located at a cellular carrier's mobile switching office and couples the carrier's cellular telephone network to telephony network 9 which is preferably the public switched telephone network (PSTN). The types of links coupling cellular MSC 7 to tandem switch 22 and telephony network 9 are known in the art and include digital T-carriers, integrated services digital network (ISDN), asynchronous transfer mode (ATM) and the like.

Cellular MSC 7 is further coupled to tandem switch 22 using known digital communication link technology. Tandem switch 22 is preferably an ORYX switch sold by PRIORITY CALL, INC. Many functions performed by tandem switch 22 are known to those of ordinary skill in the art and include telephone call routing between trunks, converting one signaling type to another, such as between digital signaling systems, dual tone multi-frequency (DTMF) signaling, multi-frequency signaling, ISDN, etc., and capturing call length and destination data for billing, etc. Although tandem switch 22 is preferably co-located with cellular MSC 7, these devices can be geographically separated and interconnected by wide area network communication links.

Tandem switch 22 is also coupled to out-of-band switch 26 for communicating out-of-band signaling data to database 16 and CSR terminal 18 using a digital communication link. A detailed description of the out-of-band signaling is provided below.

Tandem switch 22 is further coupled to ACD 24, communicating using known link technology. Automatic call distribution devices are known to those of ordinary skill in the art. ACD 24 queues incoming calls from telephones 4 and distributes them to a customer service representative, preferably via CSR terminal 18 in accordance with predetermined distribution functions. For example, ACD 24 can be configured to distribute the oldest pending call to the next available customer service representative. ACD 24 is preferably configured to transmit the telephone number of telephone 4 to CSR terminal 18 so that CSR terminal 18 can search database 16 for the user's personal contact list. This enables the customer service representative to have the user's contact list retrieved from database 16 and loaded on CSR terminal 18's display either before or at approximately the same time that the customer service representative answers the user's call.

Tandem switch 22 uses the out-of-band switches 26 and out-of-band network 28 to provide data to CSR terminal 18 which informs CSR terminal 18 of the particular tandem switch 22 receiving the call from telephone 4. The out-of-band system formed by out-of-band switches 26 and out-of-band network 28 can be any network capable of data communication transmissions, but is preferably a TCP/IP network.

Out-of-band switches 26 and out-of-band network 28 are also used by CSR terminal 18 to provide tandem switch 22 with out-of-band signaling call completion data for release link flash transfer. Methods for release link flash transfer are known in the art and refer to the ability of a user to reach a customer service representative and request another number, which is then dialed by the operator or transferred automatically by providing a data packet to the tandem switch. In the case of the present invention, however, this data is preferably provided via out-of-band switches 26 and out-of-band network 28 based on the originating telephone carrier. Of course, tandem switch 22 and CSR terminal 18 can be configured to communicate in-band, i.e., using the same communication lines as the actual audio call data.

Thus, the destination telephone number is provided to tandem switch 22 such that tandem switch 22 can dial the destination telephone number and then release the call from the customer service representative and ACD 24. As an alternative embodiment, tandem switch 22 can be configured to transfer the call to cellular MSC 7 (or another switch in telephony network 9), thereby releasing the telephony resources of system 2. In other words, releasing the link allows the telephone call to be completed such that telephone 4 communicates with the destination telephone via telephony network 9 without implicating tandem switch 22.

Figure 3:
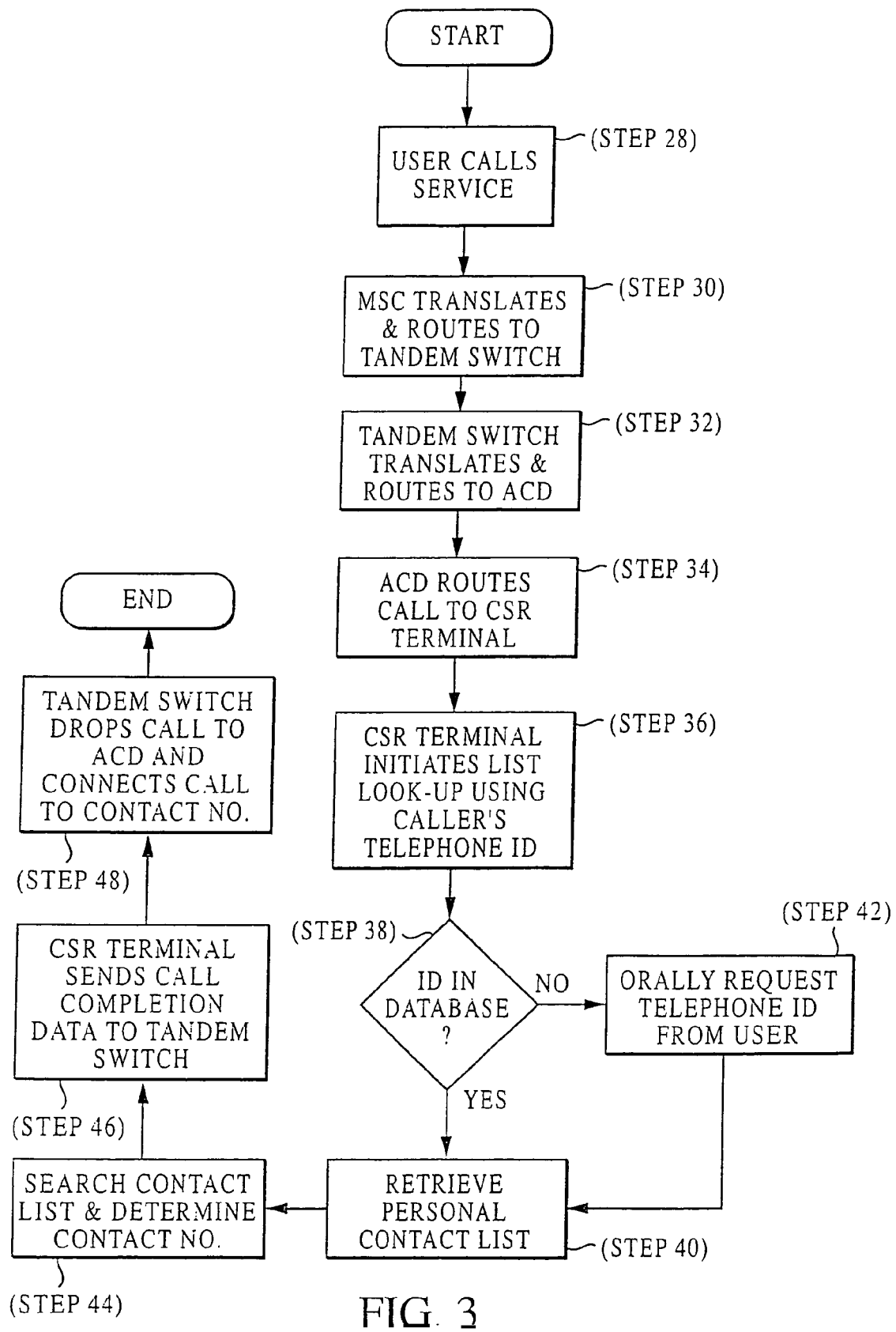
FIG. 3 is a flow chart of the call connection process of the present invention.

The operational flow which allows a user of telephone 4 to be connected to a contact number from their personal contact list is explained with reference to FIG. 3. Initially, it should be noted that it is, assumed that the user's personal contact list is available and stored in database 16. A detailed description of how a user's personal contact list is updated, i.e., created and revised, is provided below.

It should also be noted that although the operation of the telephony portion of system 2 is described with reference to a caller using a cellular telephone, the invention is not limited to such. It is contemplated that a user using a wire-based (PSTN) telephone as the call originator can also successfully use system 2. In this case, cellular MSC 7 is not used, and instead replaced by a PSTN carrier telephone switch.

A user wishing to be connected with a contact calls the personalized directory assistance service provided by system 2 (step 28). Preferably, the user dials an easy to remember telephone number, such as *4, *44, and the like. Cellular MSC 7 is configured to recognize that the dial number string belongs to the personal directory assistance service and routes the inbound call to tandem switch 22 (step 30). Prior to routing the call to tandem switch 22, cellular MSC 7 translates the user's dial string (for example, *4) to the telephone number actually associated with the personal directory service, for example, 511.

This translation allows different cellular service carriers to allow access to the service provided by the present invention using different simple user dial strings. For example, cellular telephone carrier A may support access to the personalized directory assistance service by dial string number *4, while cellular carrier B may access the service using user dial string *5. Upon receiving the inbound call, tandem switch 22 further translates the MSC dial string and routes the call to ACD 24. The translation by tandem switch 22 allows system 2 to identify the particular cellular MSC 7 from which the dial string was received along with the actual MSC dial string so that the elements of system 2 can determine what service is desired, and where the inbound call is originating from.

For example, tandem switch 22 might translate MSC dial string 511 to 9605. The string translated by tandem switch 22 is referred to as the direct inward dial (DID) number. Thus, each tandem switch 22 can have multiple DID numbers to identify a user's request for different services and their calling location. It should be noted that the user's telephone ID, i.e., telephone number, is recognized by cellular MSC 7 and transmitted to tandem switch 22, ACD 24 and CSR terminal 18 as an automatic number identification (ANI) data string.

Once a CSR terminal 18 is available to process the user's request, the ACD routes the call to that CSR terminal (step 34) along with the DID and ANI data. It should be noted that, although the preferred embodiment employs ACD 24, system 2 can be arranged without ACD 24. For example, such that tandem switch 24 completes calls to CSR terminal 18 via a private branch exchange hunt group. Because CSR terminal 18 is provided with data detailing the nature of the user's desired service and where the call originated from (for example, the originating cellular carrier), CSR terminal 18 preferably retrieves a branded audio file stored in database 16 which is associated with the DID or the user's ANI, and plays that message for the user while the user is waiting for the customer service representative. Preferably, the branded audio file is recorded using the voice of the customer service representative handling the call.

Although not shown, an alternative embodiment is contemplated in which ACD 24 or CSR terminal 18 retrieves the audio file from a processor other than that which supports database 16. In other words, this audio processor would be coupled to ACD 24 and/or CSR terminal and/or one or more of the other telephony hardware elements. As an alternative embodiment, ACD 24 retrieves and plays a generic audio file directly from database 16 or via CSR terminal 18 such that it is CSR terminal 18 which conducts the actual database table lookup in database 16 to retrieve the generic audio file. In this case, a generic audio file preferably comprises a system welcome greeting not recorded in the handling CSR's voice.

Preferably, ACD 24 transmits the DID and ANI data to CSR 18 over a data communications link, such as a TCP/IP link, which is separate from the link used to transfer the actual call, i.e., user's voice. At approximately the same time as the transferred call is being answered by a customer service representative, CSR 18 generates and submits a database lookup query to database 16 to retrieve the personal contact list associated with the caller's telephone ID, for example, the telephone number of telephone 4 (step 36).

If a list associated with the caller's telephone ID is present in database 16 (step 38), the user's personal contact list is retrieved and presented on the display of user terminal 18 (step 40). Where a personal contact list is not identified, such as the case where the user is calling from a telephone 4 different from that registered with system 2, the customer service representative must make an oral request from the user to determine the telephone ID under which they have registered (step 42). In this case, it is contemplated that an authentication password will be stored in database 16 along with the user's personal contact list such that the personal contact list will only be retrieved, or the CSR authorized to continue processing the user's request, when the authentication password stored in database 16 matches that given by the user.

Where the user provides a telephone ID and an authentication password which are present in database 16 and validated by CSR terminal 18, the user's personal contact list is retrieved and presented on the display of CSR terminal 18, as described above with respect to step 40.

Of course, the entire contents of a user's personal contact list need not be actually displayed on CSR terminal 18. In the alternative, CSR 18 can transfer the CSR list to its internal memory or storage for searching, or can initiate SQL database lookup queries on database 16. Preferably, the actual personal contact list data is not transferred to CSR terminal 18, but rather that CSR 18 initiates specific database queries once the customer service representative determines whom the user wishes to contact.

It is also contemplated that users can be grouped to access a common personal contact list, such as the case where a group of users has a common associated interest in the list, for example a company directory. It is further contemplated that each user within the group can customize the common personal contact list to his or her needs by adding entries specific to them. In other words, a user's personal contact list would be comprised of the common personal contact list plus their own entries.

Methods for initiating a query and searching a database are known. The customer service representative then uses CSR terminal 18 to search the user's personal contact list based on the request, and determines the telephone number of the desired contact (step 44). The customer service representative then causes CSR terminal 18 to send call completion data to the tandem switch via out-of-band switches 26 and out-of-band network 28 (step 46).

Recall that CSR terminal 18 was sent the tandem switch DID as a result of steps 32 and 34. CSR terminal 18 is able to determine the corresponding network address by looking up the network address, preferably a TCP/IP user datagram protocol (UDP) address from an out-of-band address table stored in database 16. Finally, tandem switch 22 drops the call to ACD 24 and transmits the contact number dial string to cellular MSC 7 to connect the call to the desired contact number via telephony network 9 (step 48). It should be noted that call completion is not limited solely to connecting the call through the originating cellular MSC 7. It is contemplated that tandem switch 22 can complete the call via a different PSTN switch coupled to telephony network 9. The call dropping process and connection via telephony network 9 is the release link flash transfer process described above.

An example of an out-of-band address table is described with reference to FIG. 4. FIG. 4 shows an out-of-band address table 50 stored in database 16. Out-of-band address table 50 is used by CSR terminal 18 as described above to determine the destination network address for the tandem switch 22 from which the user's call originated. Out-of-band address 50 is comprised of one or more records 52 in which each record 52 is comprised of a DID number field 54, a sequence field 56, a UDP address field 58, a UDP port field 60 and UDP time-out field 62. These fields, taken together, comprise a record which when a search based on DID number field 54 is initiated by CSR terminal 18, yields the UDP address, UDP port and UDP time-out values needed by CSR terminal 18 to route the desired contact number to tandem switch 22 across out-of-band network 28.

In particular, DID number field 54 represents the DID number translated by tandem switch 22 during the user's inbound call. Sequence number field 56 represents an identification number which allows multiple UDP addresses to be associated with a single DID number. Unique records for combinations with the same UDP address, port and DID number are created by assigning a unique sequence number to the combination. This is useful for supporting parallel transmissions to the same DID on tandem switch 22 or for sequential transmission upon failure of the previous UDP message. UDP address field 58 corresponds with the destination UDP network address associated with the DID number for tandem switch 22. UDP port field 60 identifies the specific process within tandem switch 22 to which CSR terminal 18 should communicate. UDP time-out field 62 sets forth the time, preferably in milliseconds, for which CSR terminal 18 should wait to receive an acknowledgment from tandem switch 22 that tandem switch 22 has received the contact number. The specific definitions of UDP address field 58, UDP port 60 and UDP time-out value 62 are known in the art.

Figure 5:
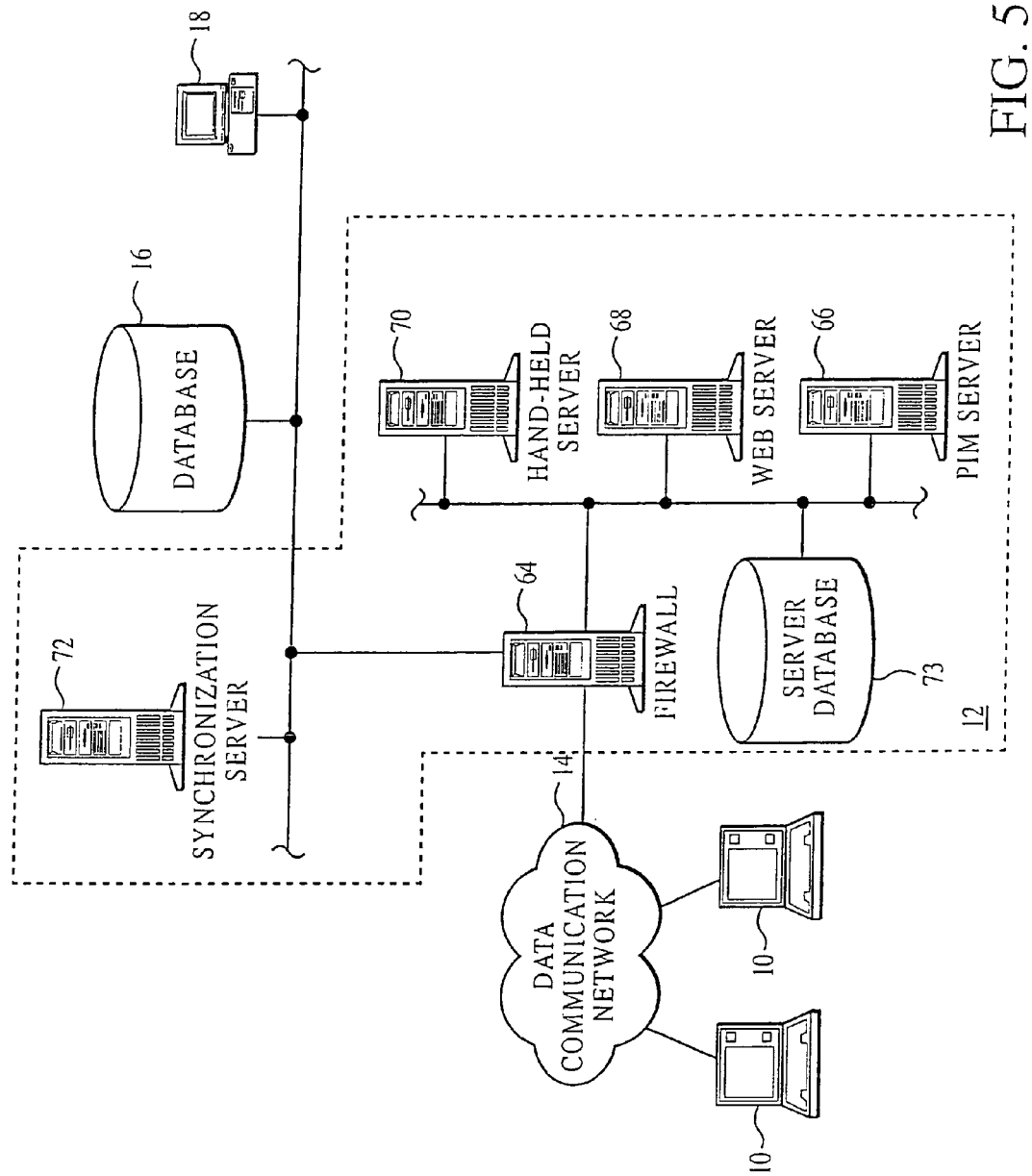
FIG. 5 is a diagram of the data communication elements of the present invention.

The data communication network aspect of the present invention, including a detailed description of data communication network hardware 12 is described with reference to FIG. 5. As shown in FIG. 5, data communication network hardware 12 is comprised of firewall 64, PIM server 66, web server 68, hand-held server 70, synchronization server 72 and server database 73. Firewall 64, servers 66-72 and database 73 can be any computer capable of communicating across a network, each preferably comprising a central processing unit, storage device such as a hard disk drive, CD-ROM, tape drive, digital video disk (DVD) drive, etc., a read-only memory and enough random access memory to support the expected number of users. In other words, firewall 64, servers 66-72 and database 73 can range from a personal computer to a mainframe computer, depending on the demand expected to be met.

Database 73 is arranged in a manner similar to database 16 and supports direct database update requests from user terminals 10. In the preferred embodiment, CSR terminal 18 directly updates database 16, while servers 66-70 directly update server database 73. Synchronization server 72 synchronizes server database 73 and database 16.

As shown in FIG. 5, firewall 64 is coupled to data communication network 14. Firewall 64 can be any device capable of running known firewall, i.e., network protection, software. In the alternative, firewall 64 can be omitted and servers 66-72 arranged to communicate directly with data communication network 14. Firewall 64, therefore, serves to isolate the elements of data communication network hardware 12 from unauthorized intrusion from users of data communication network 14.

Firewall 64 is also coupled to PIM server 66, web server 68 and hand-held server 70, all of which are coupled to the same network segment. It is contemplated that any known networking topology and technology can be used, including Ethernet technologies, token ring technologies, fiber distributed data interface (FDDI) technologies, switched networking technologies, asynchronous transfer mode (ATM) technologies, and the like. Firewall 64 is preferably configured to allow limited access to servers 66, 68 and 70 from data communication network 14, and to allow less limited communication between servers 66, 68 and 70 with synchronization server 72.

Synchronization server 72 is coupled to firewall 64 via a network interface separate from those of servers 66, 68 and 70, and is coupled on the same side of the firewall as database 16 and CSR terminal 18. One of ordinary skill in the art will recognize that synchronization server 72, database 16 and CSR terminal 18 are not necessarily resident on the same physical network segment, but rather can be separated by networking components, such as local area network switches, routers, hubs, etc.

The data communication aspect of the present invention allows a user's personal contact list to be updated (created and edited), and synchronized with other user contact lists. This is preferably accomplished in one of six ways. First, the user can call the customer service representative using the service access (*4) or another predetermined telephone number such that the customer service representative can make the desired changes to the user's personal contact list on database 16 using CSR terminal 18. Second, user terminals 10 can access web server 68 using a web browser to maintain (create and edit) their personal contact list. Third, where user terminal 10 comprises PIM contact management software, user terminal 10 can download and/or synchronize the contact data in user terminal 10 with their personal contact list via PIM server 66. Fourth, where user terminal 10 is a hand-held computer, the hand-held computer can be "hot synched" with the user's personal contact database by communicating with hand-held server 70. Fifth, the user can send an electronic mail from user terminal 10 to web server 68 describing their desired changes in detail. Sixth, the user can fax their request to the provider of system 2. Although six techniques have been described, the invention is not limited to only these techniques.

It should be noted that in each of the above cases, the user's request does not always directly update database 16. For example, where user terminal 10 is a PC or hand-held computer, user terminal 10 communicates with one of servers 66, 68 and 70, such that personal contact updating is done first on server database 73. In these cases, user terminal 10 transmits personal contact list update data to one of servers 66, 68 and 70 in which the update data comprises data corresponding to the user's desired update action. The update is communicated to server database 73 and an updated listings table is created to reflect the changes. Continuously or at periodic intervals, preferably, one hour intervals, synchronization server 72 bidirectionally synchronizes the personal contact list changes requested and stored in server database 73 with database 16 using the updated listings table. This reduces the load of editing and changing personal contact list data in a single database and increases the overall security of the system by reducing the number of different devices which are permitted to access database 16. Customer service representative initiated changes, made via CSR terminal 18, however, can either communicate directly with database 16 to make the changes or via server database 73 and synchronization server 72.

As part of the synchronization server process, synchronization server 72 searches for requested changes made via servers 66, 68 and 70, by querying the updated listings tables resident on database 73 in which this data table is comprised of update records corresponding to the personal contact list update data sent by user terminal 10 to one of servers 66, 68 and 70. Synchronization server 72 performs the requested action, for example, contact insertion, deletion, clearing, telephone ID changes, etc., on database 16. Those requested changes which are rejected are stored in the rejected updated contact listings table. Updated listings are stored in the updated contact listings table and also incorporated into the user's contact information list database table. A similar set of steps are used to synchronize updates made to database 16 with server database 73.

Where necessary, synchronization server 72 can be comprised of more than one physical server, such as where appropriate for backup or geographic distribution, and each synchronization server 72 can communicate with more than one database 16 or server database 73, such as the case where database 16 or database 73 is distributed among multiple physical hardware devices.

In addition, it is contemplated that the present invention can be implemented without synchronization server 72 such that CSR terminal 18 and servers 66-70 directly update a single database, such as database 16, or multiple databases, such as database 16 and server database 73.

It is preferred that access to hand-held server 70 and PIM server 66 be restricted until the user has established a valid account by registering for the service with a customer service representative or via web server 68. In other words, a user attempting to hot synch their hand-held computer or harmonize their PIM database with database 16 will not be permitted to do so unless they have established a valid account. Account verification can be checked, for example, by PIM server 66 or hand-held server 70 prior to accepting the harmonization request from user terminal 10.

It is also contemplated that personal contact list data stored in server database 73 can be used as the basis for harmonizing with PIM contact management software or a hand-held computer in a bidirectional manner, i.e., database harmonization can be accomplished from server database 73 to user terminal 10 via servers 66 or 70, or from user terminal 10 to server database 73 via servers 66 or 70.

Figure 6:
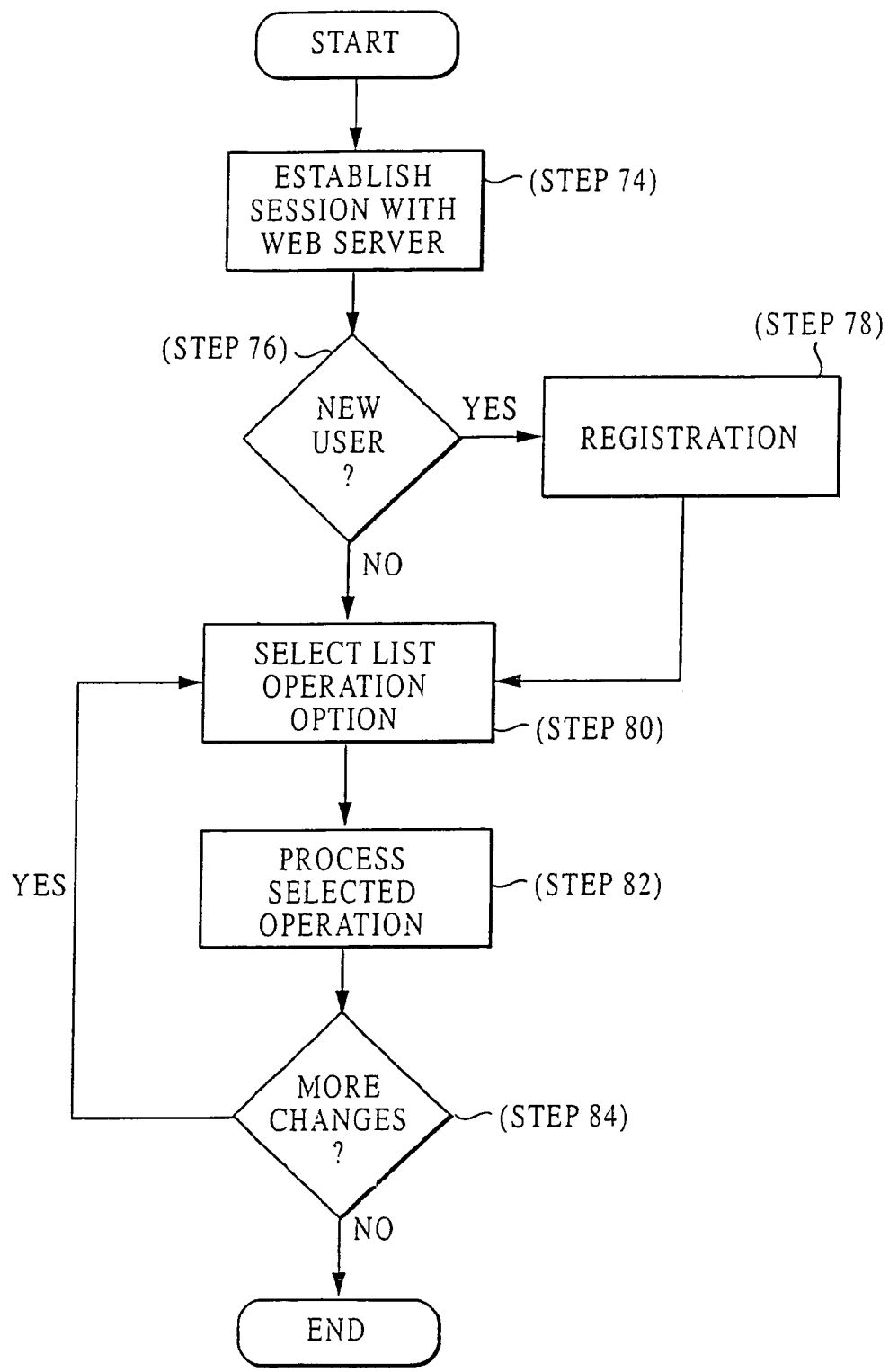
FIG. 6 is a flow chart of the interaction process between a user terminal and a web server.

The interaction between user terminal 10 and web server 68 is described with reference to the flow chart in FIG. 6. A user establishes a session with web server 68 from user terminal 10 (step 74). Session establishment with web server 68 and subsequent display screens can be accomplished using any known technique, preferably using the hypertext transfer protocol (HTTP). Web server 68 serves as the web site hosting mechanism for system 2. Web server 68 preferably supports web page transfer using pages developed with hypertext mark language (HTML), common gateway interface-bin (CGI-bin) and the like.

Upon session establishment, the user is presented with the service's home page and can select to enter the system as a new user or log in as an existing user (step 76).

Figure 7:
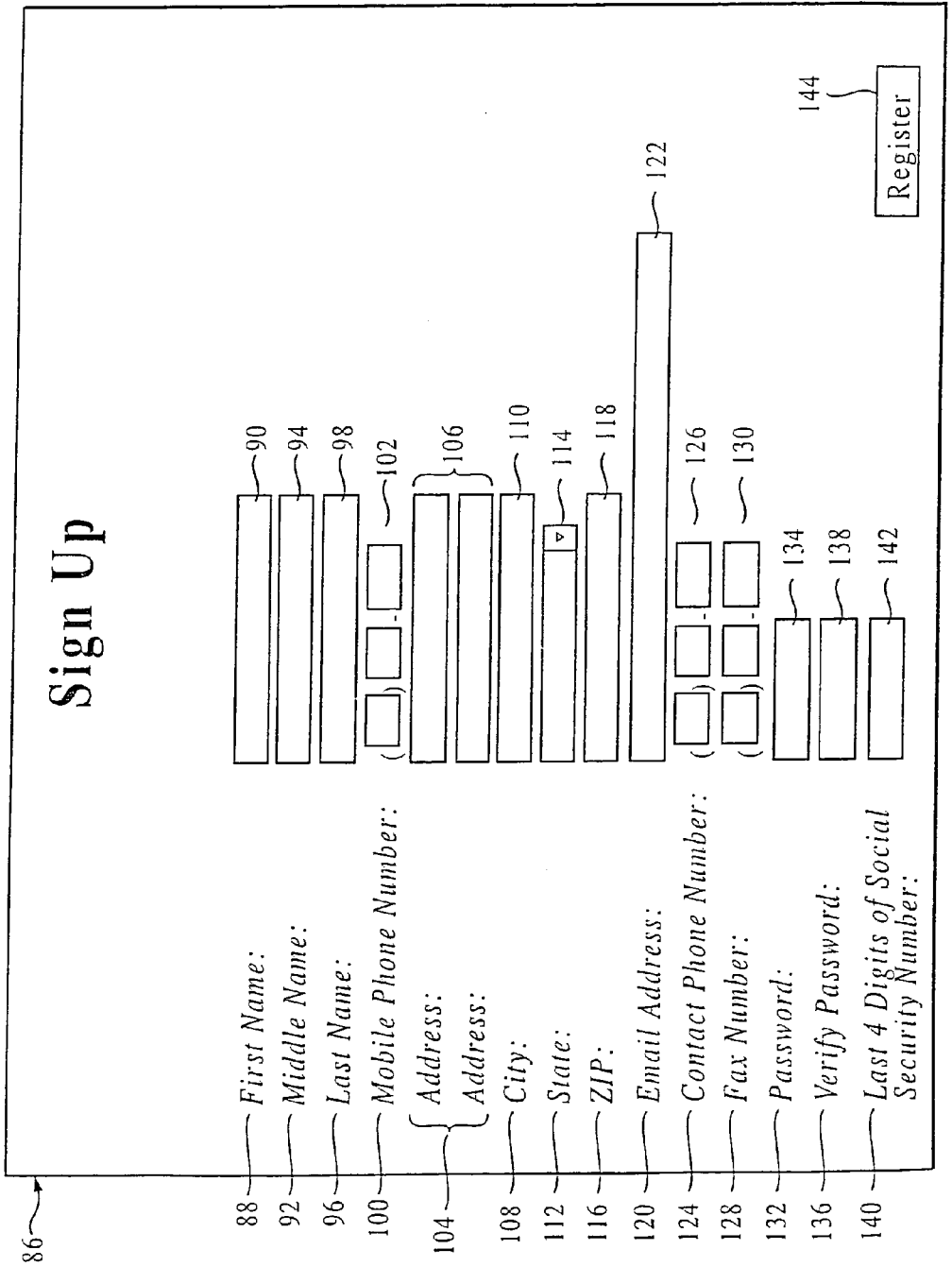
FIG. 7 is an example of an account information registration screen as presented on a user terminal.

When the user has not yet registered, such as when the user is new, web server 68 executes the registration process (step 78). The registration process includes the creation of a database record for future synchronization with database 16 comprising the user's account information. A registration information request is transmitted to user terminal 10, preferably as an electronic form to be completed by the user via the web browser software. The user then selects from a list of operations by navigating through the web site (step 80). Web server 68 then processes the selected operation (step 82). These operations and processes are described in detail below. Steps 80 and 82 are continued until the user has completed their desired personal contact list updating operation (step 84). FIG. 7 shows an example of an account information registration screen 86.

Registration screen 86 is preferably comprised of a number of data element descriptions and corresponding locations from which data can be entered using any known method for entering data on an electronic form, including using the keyboard, pull-down bars, radio buttons, etc.

Registration screen 86 is comprised of first name element 88 and corresponding first name element entry area 90, middle name element 92 and corresponding middle name element entry area 94, last name element 96 and corresponding last name element entry area 98, mobile phone number element 100 and corresponding mobile phone number element entry area 102, mailing address element 104 and corresponding mailing address element entry area 106, city element 108 and corresponding city element entry area 110, state element 112 and corresponding state element entry area 114, zip code element 116 and corresponding zip code element entry area 118, electronic mail address element 120 and corresponding electronic mail address element entry area 122, contact phone number element 124 and corresponding contact phone number element entry area 126, fax number element 128 and corresponding fax number element entry area 130, password element 132 and corresponding password element entry area 134, password verification element 136 and corresponding password verification element entry area 138, social security number element 140 and corresponding social security number element entry area 142 and registration button 144.

Not all of these elements are necessarily required in order to establish an account. Preferably, an account can be established for a user who provides at least last name element 96, mobile phone number element 100, electronic mail address element 120, contact phone number 124 and password element 132. It is also contemplated that additional data elements can be gathered from a user including credit card data for billing and electronic commerce services, bank account data for bill paying, services, user preferences and demographic data for targeted advertising, electronic commerce, etc.

Billing for the service provided by system 2 can be based on debiting prefunded account balances tracked by database 16, charging the billing account separately for each transaction or periodically charging a flat fee for a large or unlimited amount of service use.

In particular, password verification element 136 is used to ensure that the password entered in password element entry area 134 is the password intended by the user. Social security number element 140 is used as an alternate means of identifying the user in the event that the user has forgotten their password. Of course, any combination of elements in registration screen 86 can be implemented.

Upon completing the required entry areas on registration screen 86, the user selects registration button 144, thereby causing user terminal 10 to transmit the registration data corresponding to the entered data to web server 68. Web server 68 verifies that the entered data is valid, for example, that the password element 132 and verified password element 136 match, and that the account is not a duplicate of that previously established. Referring again to FIG. 6, when the user is not new and has successfully been authenticated, or has just registered, user terminal 6 presents a list of operational options from which the user selects (step 80).

Figure 8:
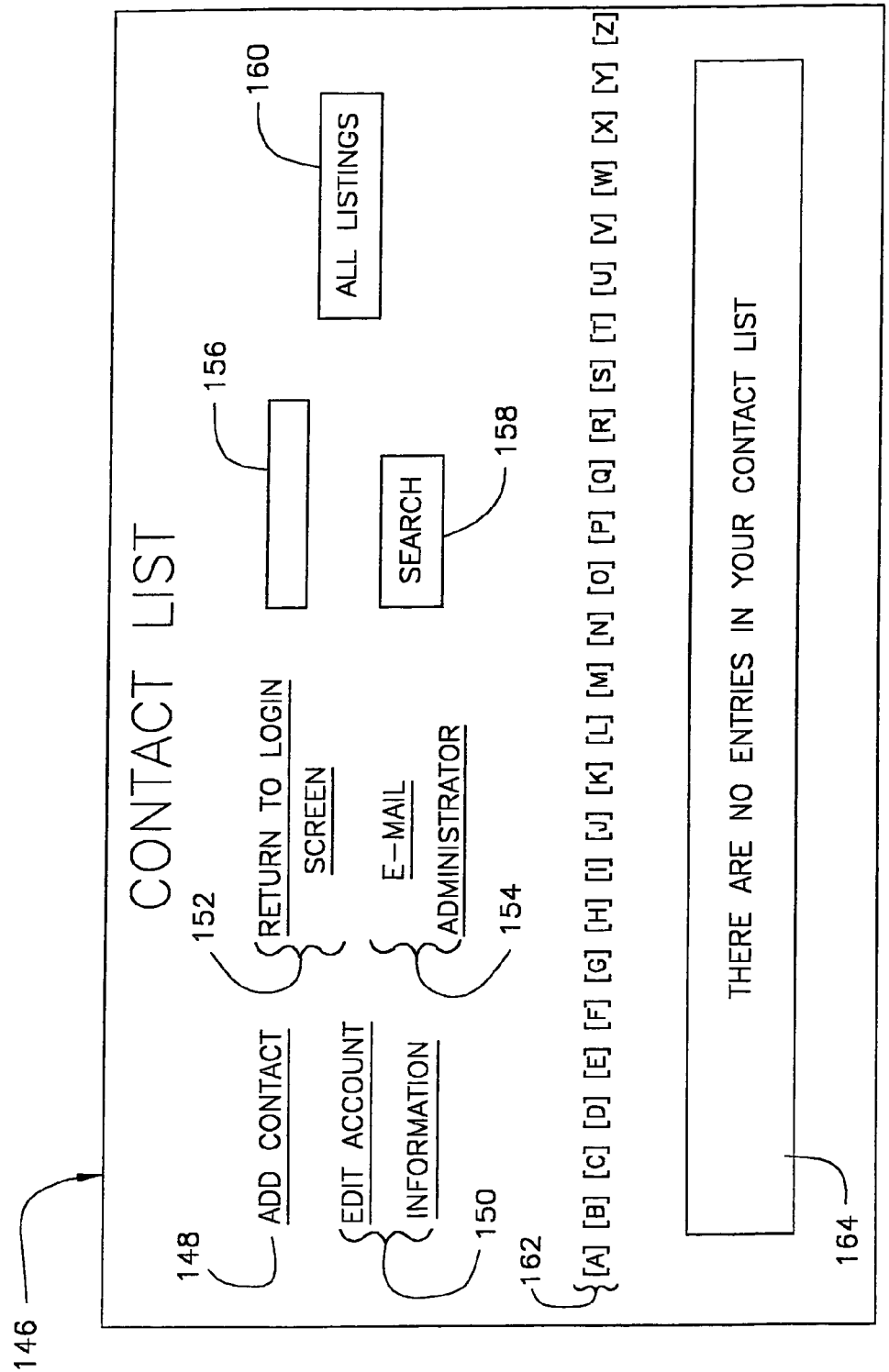
FIG. 8 is an example of a contact summary screen as presented on a user terminal.

Part of a preferred list of options from which a user may select is shown in FIG. 8. The remaining options, contact editing and contact deletion, are discussed below. FIG. 8 is an example of a screen display presented in a browser window on user terminal 10 showing contact summary screen 146. Contact summary screen 146 preferably allows a user to add contact by selecting add contact link 148, edit account information by selected edit account information link 150, return to the home page by selecting return to log-in screen link 152 or generate an electronic mail to the administrator of web server 68 by selecting electronic mail administrator link 154.

Contact summary screen 146 also allows a user to search for an entry in their personal contact list by entering the search parameters in search entry area 156 and selecting search button 158. Selecting all listings button 160 causes the user's entire personal contact list to be retrieved from database 16 and presented on the display of user terminal 10. Selecting a letter from alphabetic character list 162 causes all entries in the contact list corresponding to the selected letter to be displayed on user terminal 10. Corresponding entries can be based on either the first initial of the contact's first name and/or the first character of the contact's last name.

Information area 164 is comprised of entries corresponding to the selection made from alphabetic character list 162, or the status of the user's selection, for example, that a contact has been added and/or other relevant information which is communicated to the user.

As shown in FIG. 8, information area 164 indicates that there are no entries in the user's contact list. It should be noted that in the case where entries in the user's personal contact list were made previously, a user who successfully logs into web server 68 is presented with contact summary screen 146 arranged such that the entries are displayed in information area 164. Known scrolling or screen display methods can be used to display portions of the user's personal contact list where the number of entries is larger than that which can be displayed at one time.

Although not shown, summary screen 146 can include other links such as software download links, links to other services, such as chat rooms, etc.

Figure 9:
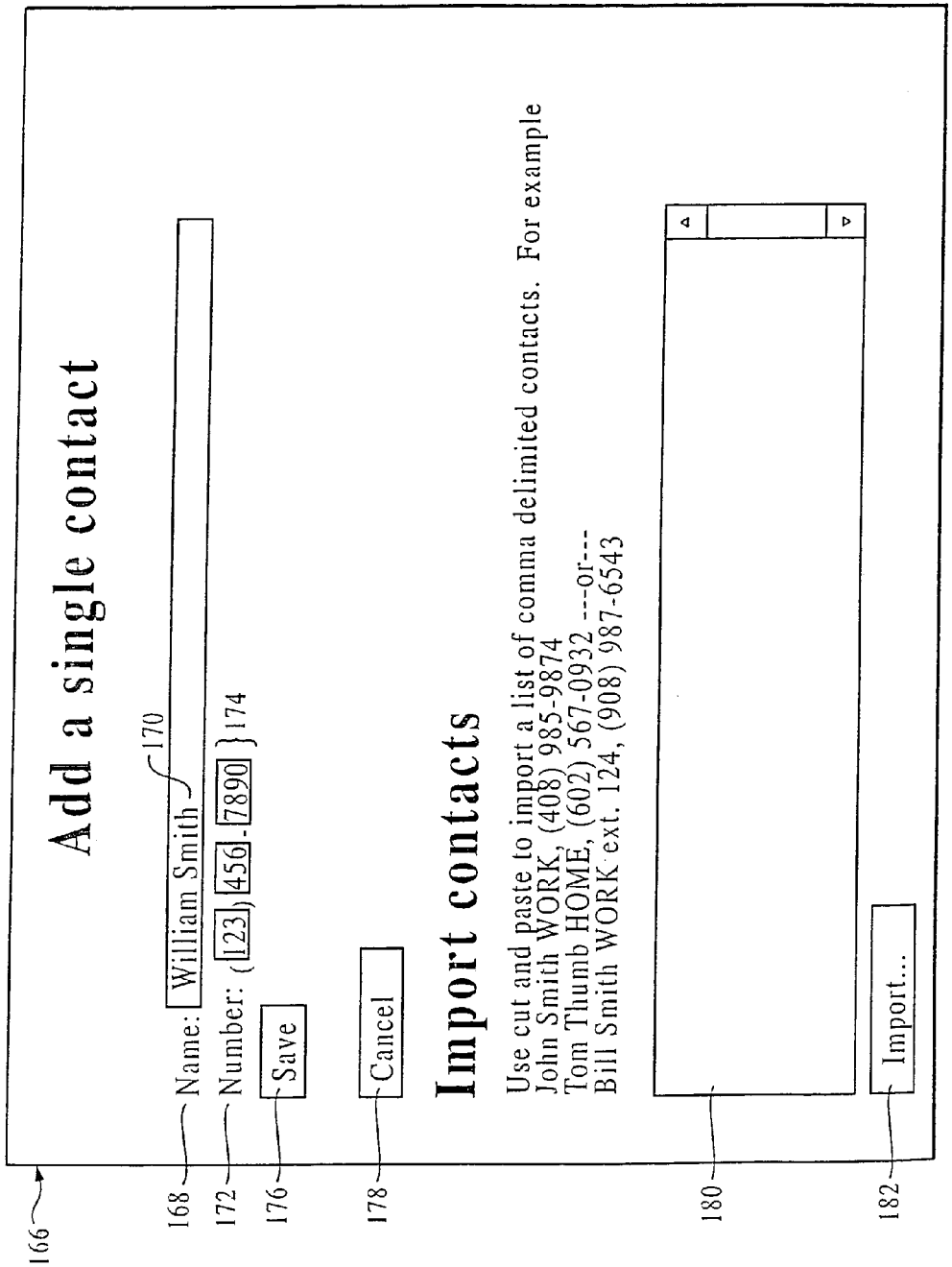
FIG. 9 is an example of a contact addition screen as presented on a user terminal.

Selecting add contact link 148 indicates to web server 68 that the user wishes to add one or more contacts. FIG. 9 shows an example of add contact screen 166, displayed when add contact link 148 is selected. Add contact screen 166 comprises a contact name element 168 and corresponding contact name element entry area 170, contact number element 172 and corresponding contact number element entry area 174. As shown in FIG. 9, the user has, for example, entered "William Smith" in contact name element entry area 170 with a corresponding telephone number of "(123) 456-7890" in telephone number element entry area 174. The user selects save button 176 if satisfied with the entry, or can cancel the entire operation by selecting cancel button 178. Selecting cancel button 178 preferably causes contact summary screen 146 to be displayed on user terminal 10.

The user can enter a group of contacts by entering one or more contact names and numbers, preferably using a comma delimited format so that web server 68 can parse the entries in input area 180. Of course, any method for distinguishing between personal contact list entries can be used in input area 180. Add contact screen 166 also includes import button 182 which, when selected, allows a group of personal contact entries to be transferred from user terminal 10 to web server 68. Methods for transferring files between a computer and a web server are known.

Although not shown, as discussed above, add contact screen 166, and all other screens which display contact data, can be arranged to allow for the capture and display of more detailed contact data.

Figure 10:
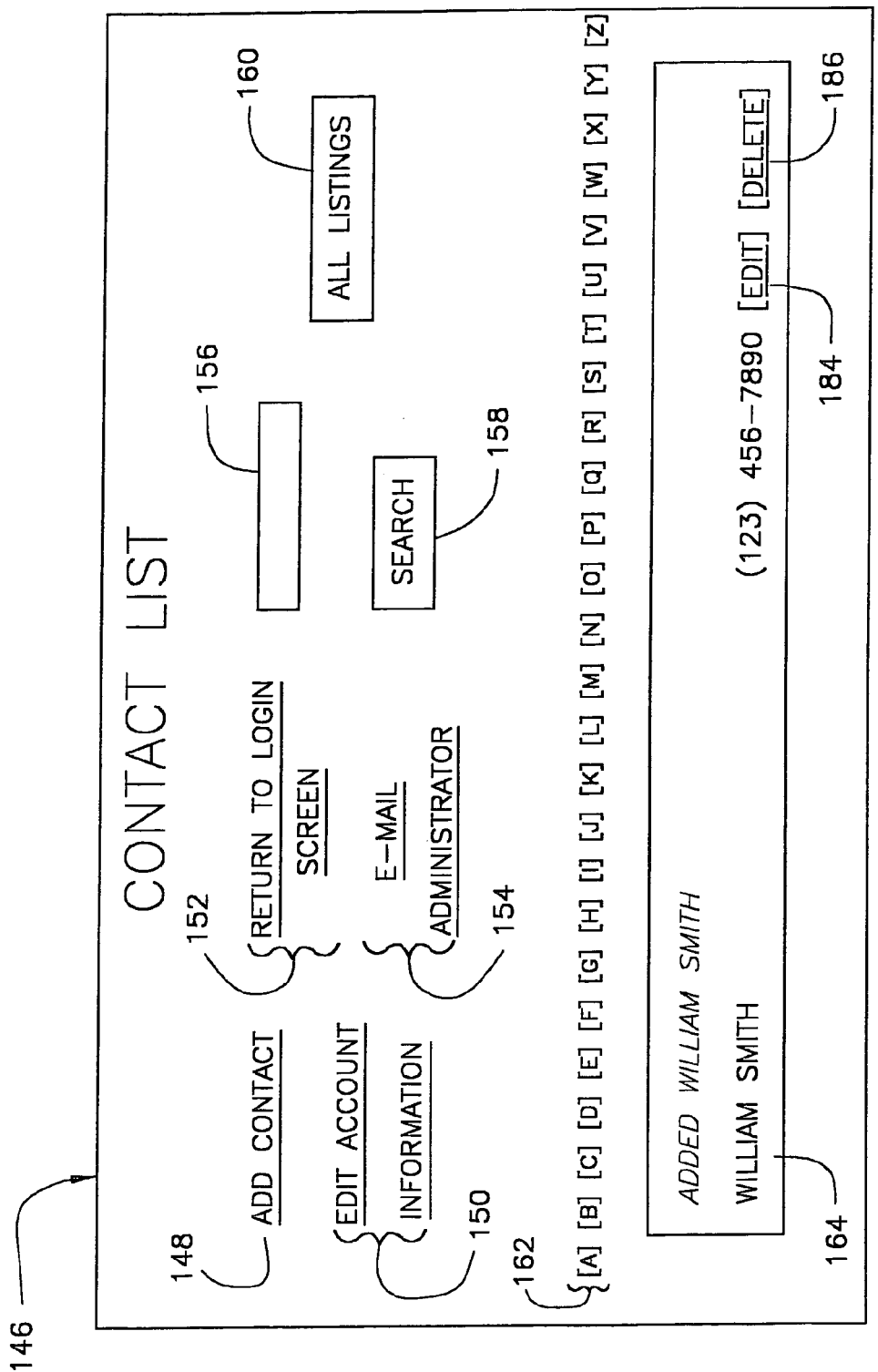
FIG. 10 is an example of a contact summary screen as presented on a user terminal after a user has saved a contact list addition entry.

As discussed above, selecting save button 176 causes user terminal 10 to transmit the contact entry or entries to be transmitted to web server 68. FIG. 10 shows an example of contact summary screen 146 displayed on user terminal 10 after save button 176 has been selected. In particular, information area 164 shows that "William Smith" has been added along with the corresponding telephone number.

As shown in FIG. 10, information area 164 also includes edit link 184 and delete link 186. When selected by a user, edit link 184 causes user terminal 10 to display a screen similar to that of FIG. 9, thereby allowing the user to edit the corresponding contact entry.

Selecting delete link 186 indicates to web server 68 that the user wishes to delete the corresponding entry.

Figure 11:
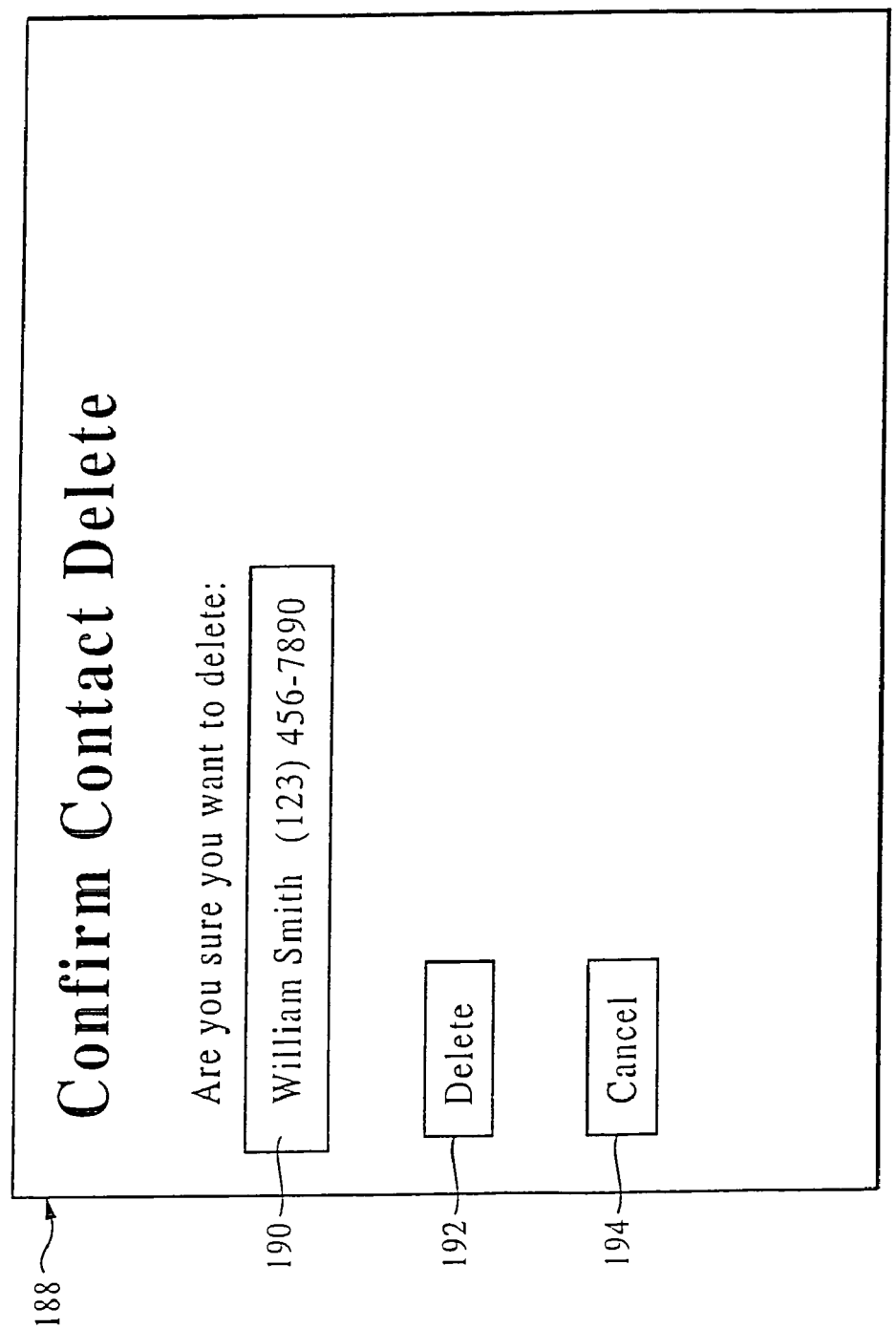
FIG. 11 is an example of a contact deletion confirmation screen as presented on a user terminal.

FIG. 11 shows an example of contact deletion confirmation screen 188, displayed when the user selects delete contact link 186. As shown in FIG. 11, contact deletion confirmation screen 188 preferably comprises contact area 190, delete button 192 and cancel button 194. Contact area 190 preferably contains the contact name and number corresponding to the contact displayed in information area 164 from which the user selected delete contact link 186. To confirm the deletion, the user selects delete button 192. This selection causes user terminal 10 to indicate to web server 68 that the user wishes to delete the corresponding contact name entry from the user's personal contact list. Selecting cancel button 194 indicates to web server 68 that the user wishes to cancel the deletion operation. In this case, web server 68 preferably causes user terminal 10 to display contact summary screen 146.

Figure 12:
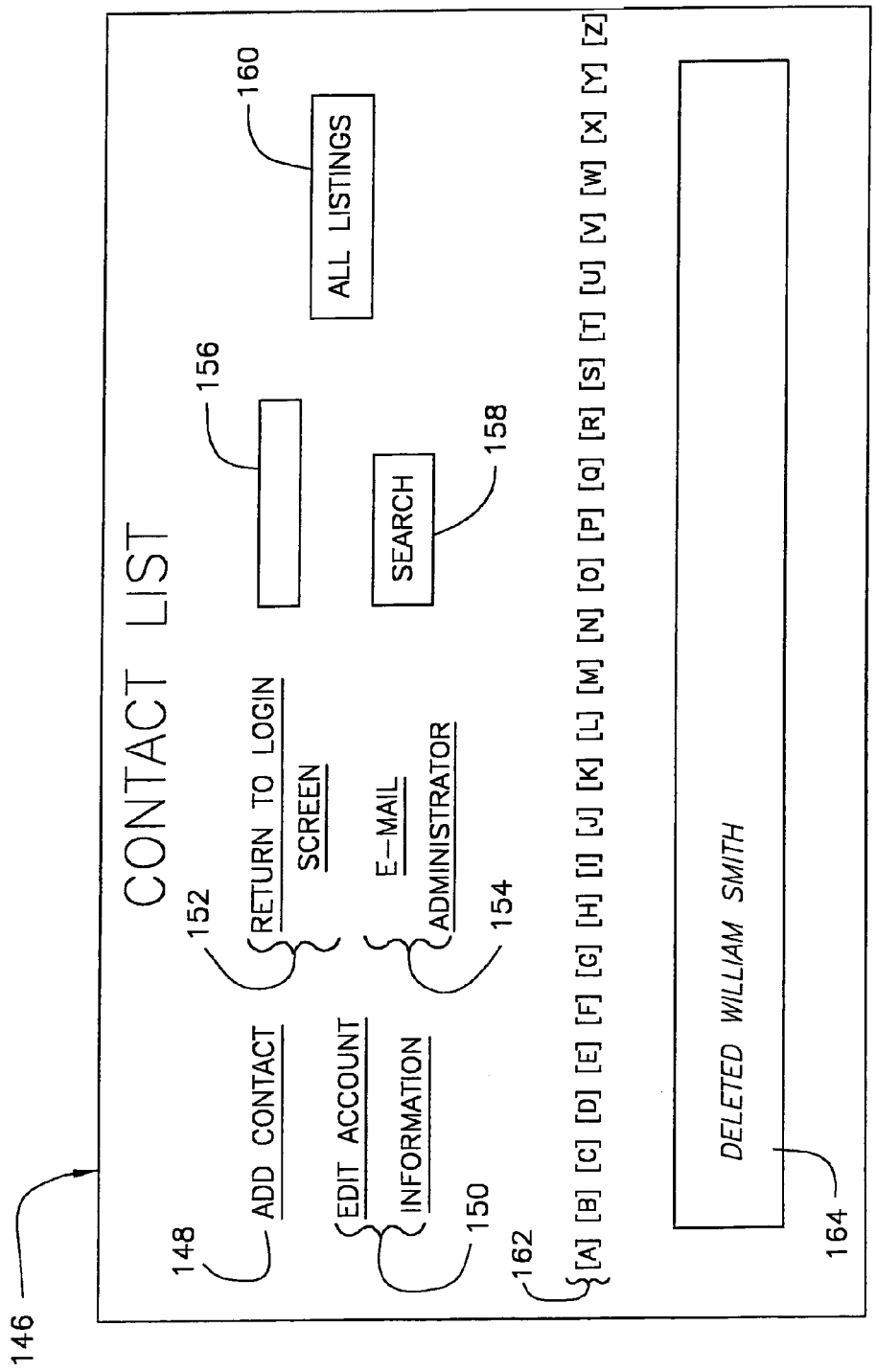
FIG. 12 is an example of a contact summary screen as presented on a user terminal after a user has requested deletion of a contact list entry.

FIG. 12 shows an example of contact summary screen 146 displayed when the user confirms deletion by selecting delete button 192 on contact deletion confirmation screen 188. In particular, information area 164 indicates that the contact, "William Smith" in this example, has been deleted.

As discussed above, changes made to the user's personal contact list, such as by adding a contact via add contact screen 166, deleting a contact via contact deletion confirmation screen 188 or editing a contact by selecting edit contact link 184 causes a corresponding record in server database 73 to be created as an update record. This update record is synchronized by synchronization server 72 with database 16 at the predetermined periodic synchronization intervals.

Figure 13:
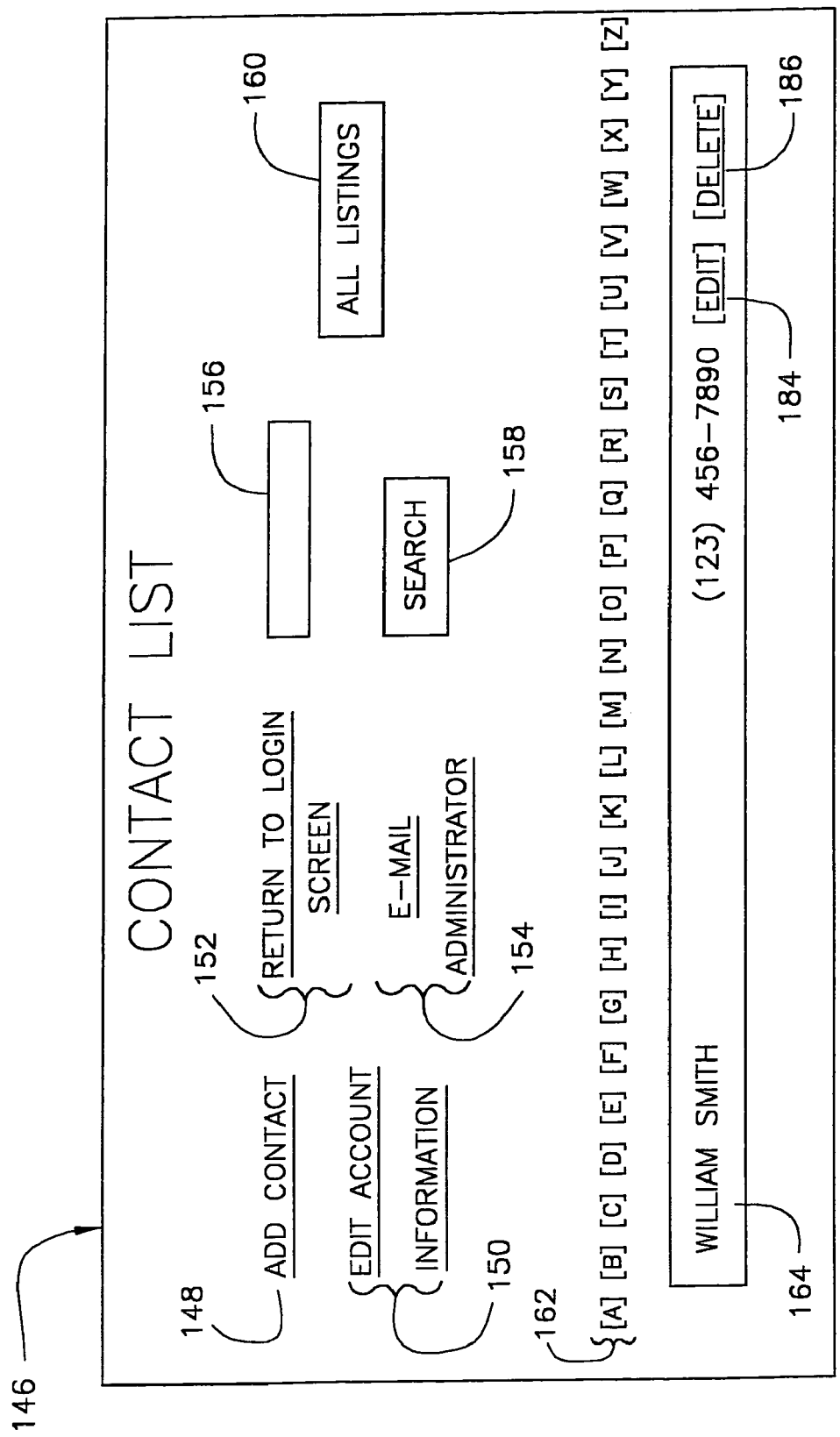
FIG. 13 is an example of an existing user's contact summary screen as presented on a user terminal.

When a user with an existing account establishes a session with web server 68, the user's personal contact list is retrieved from server database 73 by web server 68 and transferred to user terminal 10 as part of the data comprising contact summary screen 146. An example of contact summary screen 146 displayed when an existing user establishes a session with web server 68 is shown in FIG. 13. In particular, information area 164 shows the user's personal contact list, along with provisions to edit the contact by selecting edit contact link 184 or deleting the corresponding contact by selecting delete contact link 186.

As such, the user can navigate through the various display screens presented by web server 68 by selecting particular list operation options (step 80). Depending on the selected operation, web server 68 processes the selected operation, for example, contact addition, editing and deletion (step 82). The user can navigate through the web site provided by web server 68 making changes as necessary (step 84). The changing process continues until the user logs off by leaving the web site or by logging off from web server 68, preferably by selecting a log-off button or link (not shown).

Software to harmonize hand-held computer and other hand-held computing device databases with larger computers, such as personal computers, is generally known. Typically, however, this software requires that the hand-held computer and larger computing device be present in the same room such that they can be physically connected with a cable or in line of sight for infrared communication. The present invention allows harmonization between a hand-held computer (as user terminal 10) and hand-held server 70 via data communication network 14. In particular, user terminal 10 is equipped with software which allows user terminal 10 to initiate a communication session with hand-held server 70. This session preferably includes an authentication mechanism such as a user ID and password to ensure that the user is authorized to use system 2, and in particular, authorized to harmonize databases with server database 73 via hand-held server 70.

Once the communication session has been established, the hand-held computer sends personal contact list coordination data to hand-held server 70, including additions, deletions and changes to be made to the user's personal contact list. Preferably, hand-held server 70 transfers this data to server database 73 for subsequent synchronization with database 16 via synchronization server 72. In an alternative embodiment, personal contact list changes made via hand-held server 70 can be directly harmonized with database 16.

A similar arrangement is made with respect to PIM server 66 where user terminal 10 is a PC utilizing PIM contact management software. Software for synchronizing a PIM with a server such as PIM server 66 is known. For example, software provided by Paragon Software Limited is installed on user terminal 10 and transmitted to PIM server 66 via data communication network 14. In the preferred embodiment, PIM server 66 preferably transmits the personal contact list coordination data to server database 73. This data is then synchronized with database 16 via synchronization server 72. In the alternative, it is contemplated that PIM server 66 can directly update database 16.

Changes to a user's personal contact list made via CSR terminal 18 can be made using a web browser loaded on CSR terminal 18, or preferably by a graphical user interface application program which requires less navigation than the above-described browser-based method. The graphical user interface application program can be a MICROSOFT WINDOWS application program which allows a customer service representative to quickly register a new user and update the user's personal contact database in database 16 by adding, deleting and editing database entries. The update information is either synchronized with server database 73 by synchronization server 72 or transmitted directly to the updated listings table in server database 73 as contact list revision data.

It should be noted that although the present invention has been described in detail in terms of a personalized directory assistance system which enables the automatic completion of the user's call, the present invention is not limited to such.

As an alternative embodiment, it is contemplated that the present system can be used to perform operations requested by a user, such as for electronic commerce applications. For example, a user can establish a purchasing profile including their credit card number and can populate their personal contact list in database 16 (and server database 73) with electronic commerce information using any of the aforementioned techniques. The user can use telephone 4 to contact a customer service representative to inquire about personal information they have stored in database 16, or other information made available by the provider of system 2 and stored in database 16. It is contemplated that the user can store data relating to their favorite restaurants and favorite stores.

For example, the user can store his or her clothing sizes in database 16 and use system 2 to contact a customer service representative to arrange for purchase of a pair of pants. The customer service representative has access to a number of vendors whose relevant data is stored in database 16, for example, telephone number, store location, price, Internet web page uniform resource location (URL), etc. and can promptly order the pants in the correct size.

In addition, because the present invention contemplates storing contact addresses, and other data regarding the contact, a user can use telephone 4 to contact a customer server representative to order goods and/or services for delivery directly to the contact.

Although the user can store personal information about themselves and their contacts in database 16 for electronic commerce purposes, this information is not always required. For example, the customer service representative can be provided with Internet access via CSR terminal 18 and can search the Internet to fulfill the request. It is also contemplated that a user can contact a customer service representative in order to buy tickets to events for delivery to the user, or to a contact. Similarly, a user can contact a customer service representative via system 2 and request the best price for an item they wish to buy, even if the best price is not taken from the retailers in the user's personal contact list. In this case, the customer service representative uses CSR terminal 18 to search the Internet using known search techniques to determine the best available price for the item. The user can then purchase the item directly at the store, or through the provider of system 2.

It is also contemplated that the present invention can be used to implement a bill paying service. In particular, a user will establish a payment profile in database 16 (and server database 73) including bank account information, security codes, and names, addresses and account numbers of payees. When the bill arrives from an authorized payee, the user preferably reviews the bill for accuracy, then contacts a customer service representative using system 2 to authorize payment. Techniques for the actual remittance of bill payments are known and can be used by the provider of system 2 to pay the bill from the user's authorized bank account.

It is also contemplated that the user contact database can be used to store data relating to special occasions, such as birthdays, anniversaries and the like. When the date of the special occasion nears, an alert is displayed on CSR terminal 18 so that a customer service representative can contact the user to remind the user of the special occasion. The customer service representative can offer to send gifts, flowers, greeting cards, etc. to the contact, and can use any of the above-described techniques for fulfilling the user's request.

It is also contemplated that a user can access system 2 to request that a customer service representative set up conference calls, send electronic mails, faxes, initiate a page or short message service (SMS) message, request directions which can be sent to the user via, for example, electronic mail, fax or an SMS message. Also, a user can contact the customer service representative via system 2 to locate a restaurant, request restaurant reviews and information, and even request that the customer service representative make a reservation for them.

In sum, the present invention provides a human portal which provides access to information and services via a human operator, while leveraging the ubiquity and access capabilities of a wireless telephone.

The present invention advantageously provides a system which allows the user of a telephone, in particular, a mobile telephone, to easily complete a call to a destination, even when they do not know the number, and without the need to fumble with the keypad of their telephone to attempt to recall the telephone number from the memory of telephone 4. The present invention also obviates the need of a user to start PIM software on their laptop or fumble with their hand-held computer to retrieve the contact's telephone number. By allowing a connection with a customer service representative who has access to the user's personal contact list via a simple dial string, the user can easily and safely be connected to their destination.

The present invention further advantageously provides for a plurality of techniques to create and update their personal contact list. The present invention provides for the synchronization of user's databases with a database in system 2 (database 16), thereby further simplifying the process of maintaining multiple contact lists in forms suitable for the different technologies and needs of the user.

The present invention also advantageously allows a user to easily engage in electronic commerce, without special hardware at the user's location and regardless of the user's ability to access a computer network such as the Internet. The user can easily request and receive services and information, preferably based on a prestored profile.

Although the present invention has been described in relation to particular embodiments thereof, many other variations and modifications and other uses will become apparent to those skilled in the art. It is preferred, therefore, that the present invention be limited not by the specific disclosure herein, but only by the appended

The invention claimed is:

1. A personalized assistance system for a user of a telephone, the personalized assistance system comprising:
    a first database, the first database having a contact list for the user, the contact list including at least one contact name and a corresponding contact number;
    a telephone identification code uniquely associated with the telephone said identification code being transmitted to said personalized assistance system, when said user calls the system; and
    a customer service representative terminal coupled to the database and the telephone hardware, the telephone identification code prompting automatic retrieval of the contact list to the customer service representative terminal in response to processing of said telephone identification code, the customer service representative terminal searching said contact list in response to a user query to locate a designated contact from the user's contact list and causing the telephony hardware to connect the telephone with the contact number corresponding to the designated contact, wherein said system provides a multimedia message to said user while said user is connected with said personalized assistance system.

2. The system as claimed in claim 1, wherein said multimedia message is an audio message.

3. The system as claimed in claim 2, wherein said audio message is associated with a sponsor.

4. The system as claimed in claim 3, wherein said sponsor is the originating telephone company of said user.

5. The system as claimed in claim 1, wherein said multimedia message is provided before said customer service representative picks up said user's call.

6. The system as claimed in claim 1, wherein said system stores user data in a user table, wherein said data is selected from the group consisting of name, address, company, telephone carrier, billing information, credit card data, electronic commerce data, bank account data, bill paying services data, user preferences, demographic data.

7. The system as claimed in claim 6, wherein said user data is for targeted advertising.

8. The system as claimed in claim 6, wherein said user data is for electronic commerce transactions.

9. The system as claimed in claim 1, wherein said branded audio message is stored in said database, associated with said user's DID or ANI.

10. The system as claimed in claim 1, wherein said audio message is recorded in the same voice as the particular said customer service representative that said user is connected to.

11. The system as claimed in claim 1, wherein said audio message is retrieved from a processor other than a processor supporting said database.

12. The system as claimed claim 1, wherein said audio message is a generic audio file for a system welcome.

13. The system as claimed in claim 1, wherein billing for use of said personalized assistance system is based on any method selected from the group consisting of debiting prefunded account balances; billing per transaction; and charging a flat fee for a amount of service use.

14. A personalized assistance system for a user of a telephone, the personalized assistance system comprising:
    a first database, the first database having a contact list for the user, the contact list including at least one contact name and a corresponding contact number;
    a telephone identification code uniquely associated with the telephone said identification code being transmitted to said personalized assistance system, when said user calls the system; and
    a customer service representative terminal coupled to the database and the telephone hardware, the telephone identification code prompting automatic retrieval of the contact list to the customer service representative terminal in response to processing of said telephone identification code, the customer service representative terminal searching said contact list in response to a user query to locate a designated contact from the user's contact list and sending a communication to said designated contact.

15. The system as claimed in claim 14, wherein said communication sent to said designated contact is selected from the group consisting of: an electronic mail (e-mail), a facsimile, a page and a SMS (Short Message Service).

* * * * *